United States Patent
Lee et al.

(10) Patent No.: US 11,657,844 B1
(45) Date of Patent: May 23, 2023

(54) HEAT-ASSISTED MAGNETIC RECORDING HEAD WITH A HEAT SINK HAVING A LINER

(71) Applicant: Seagate Technology LLC, Fremont, CA (US)

(72) Inventors: Tae-Woo Lee, Eden Prairie, MN (US); Jiaoming Qiu, Maple Grove, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/654,878

(22) Filed: Mar. 15, 2022

(51) Int. Cl.
G11B 5/31 (2006.01)
G11B 5/48 (2006.01)
G11B 5/73 (2006.01)
G11B 5/00 (2006.01)

(52) U.S. Cl.
CPC ............ G11B 5/7375 (2019.05); G11B 5/314 (2013.01); G11B 5/4866 (2013.01); G11B 2005/0021 (2013.01)

(58) Field of Classification Search
CPC ....... G11B 5/314; G11B 5/4866; G11B 11/24; G11B 13/08; G11B 2005/0021; G11B 5/6088; G11B 7/1387; G11B 5/3133; G11B 5/3135; G11B 5/48
USPC .......................................................... 360/59
See application file for complete search history.

(56) References Cited

U.S. PATENT DOCUMENTS

| | | | |
|---|---|---|---|
| 8,130,599 B2 | 3/2012 | Komura et al. | |
| 8,169,731 B2 | 5/2012 | Mizuno et al. | |
| 8,208,349 B2 | 6/2012 | Tanaka et al. | |
| 8,243,559 B2 | 8/2012 | Komura et al. | |
| 8,325,567 B2 | 12/2012 | Miyauchi et al. | |
| 8,437,230 B2 | 5/2013 | Aoki et al. | |
| 8,934,198 B2 | 1/2015 | Zou et al. | |
| 9,153,267 B1 | 10/2015 | Komura et al. | |
| 9,251,837 B2 | 2/2016 | Zhu et al. | |
| 9,620,151 B1 | 4/2017 | Shimazawa et al. | |
| 9,626,991 B2 | 4/2017 | Chen et al. | |
| 9,728,209 B2 | 8/2017 | Chen et al. | |
| 9,799,352 B1 | 10/2017 | Chen et al. | |
| 10,043,542 B2 | 8/2018 | Shimazawa et al. | |
| 10,062,401 B1 | 8/2018 | Zhao et al. | |
| 10,229,704 B2 | 3/2019 | Blaber et al. | |
| 10,311,906 B2 | 6/2019 | Blaber et al. | |
| 10,490,214 B1 * | 11/2019 | Chen ...................... | G11B 5/314 |

(Continued)

FOREIGN PATENT DOCUMENTS

WO 2016/191707 A1 12/2016

*Primary Examiner* — Nabil Z Hindi

(57) ABSTRACT

A heat-assisted magnetic recording head includes a near-field transducer and a heat sink. The near-field transducer includes a middle disk and a near-field emitter. The near-field emitter includes a peg and an anchor disk. The peg is configured to produce a hot spot on a proximal magnetic disk. The peg is disposed proximal to a media-facing surface of the heat-assisted magnetic recording head. The anchor disk is disposed behind the peg relative to the media-facing surface. The heat sink includes a core and a liner. The core includes a primary metal, and the liner includes a primary metal. The liner is coupled to the core and is disposed along an outer surface of the core. The middle disk is disposed between and coupled to the liner and the anchor disk. The primary metal of the liner comprises at least one of iridium, rhodium, tantalum, tungsten, or ruthenium.

20 Claims, 6 Drawing Sheets

(56) References Cited

U.S. PATENT DOCUMENTS

| | | |
|---|---|---|
| 10,490,221 B1 | 11/2019 | Chen |
| 10,636,440 B2 | 4/2020 | Cheng et al. |
| 10,699,732 B2 | 6/2020 | Cheng et al. |
| 10,916,262 B1 | 2/2021 | Janjua et al. |
| 2021/0027808 A1 | 1/2021 | Matsumoto et al. |
| 2021/0027809 A1 | 1/2021 | Habibi et al. |

\* cited by examiner

HEAT-ASSISTED MAGNETIC RECORDING HEAD WITH A HEAT SINK HAVING A LINER

TECHNICAL FIELD

The disclosure relates to a near-field transducer for a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD typically includes a laser, a near-field transducer (NFT) configured to briefly heat a small hot spot on a surface of a magnetic disk of the HDD, and a write pole configured to write data to the magnetic disk in the vicinity of the hot spot. The process of generating and condensing localized surface plasmons (LSPs) on the NFT to produce the hot spot generates enormous amounts of heat which may degrade and/or deform various components of the NFT, thus potentially reducing the performance and/or life expectancy of the HAMR head and the HDD.

SUMMARY

The present disclosure describes a heat-assisted magnetic recording (HAMR) head having a near-field transducer (NFT) that includes a near-field emitter and a more thermally stable middle disk. In some examples, the near-field emitter is a single, continuous feature that includes a peg disposed near a media-facing surface of the HAMR head and an anchor disk disposed behind the peg relative to the media-facing surface. The middle disk includes at least one thermally stable material. Providing a middle disk that includes a thermally stable material may, in some examples, reduce or prevent the occurrence of certain failure modes under thermal exposure (e.g., middle disk recession). A thermally stable middle disk may improve the reliability of HAMR heads.

The present disclosure also describes a HAMR head having a heat sink that includes a core and a liner that encloses the core. The liner includes a thermally stable material. In some examples, utilizing a heat sink with a liner of a thermally stable material reduces defects in the heat sink (e.g., reducing recession of the heat sink under thermal exposure). Providing a liner of a thermally stable material on a heat sink may, in some examples, improve the physical integrity of the heat sink and may enable the heat sink to dissipate heat away from features of the HAMR head (e.g., an NFT) more effectively and consistently over the lifetime of the HAMR head.

In one example, a heat-assisted magnetic recording head includes a near-field transducer including: a middle disk; and a near-field emitter including: a peg configured to produce a hot spot on a proximal magnetic disk, the peg disposed proximal to a media-facing surface of the heat-assisted magnetic recording head; and an anchor disk disposed behind the peg relative to the media-facing surface; and a heat sink including: a core including a primary metal; and a liner including a primary metal, wherein the liner is coupled to the core and is disposed along an outer surface of the core, wherein the middle disk is disposed between and coupled to the liner and the anchor disk, and wherein the primary metal of the liner comprises at least one of iridium, rhodium, tantalum, tungsten, or ruthenium.

These and other features and aspects of various examples may be understood in view of the following detailed discussion and accompanying drawings.

DETAILED DESCRIPTION

Figure 1:
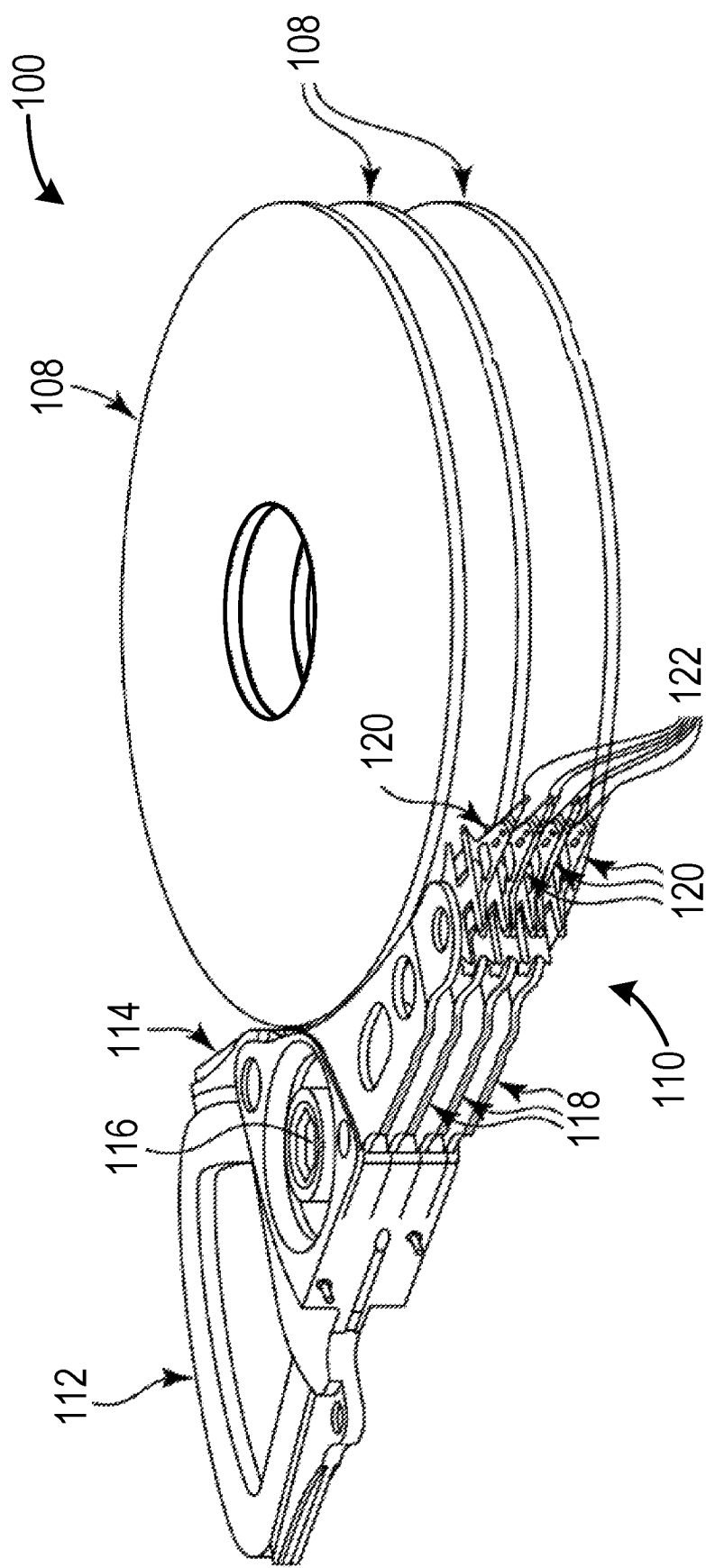
FIG. 1 is a perspective view of an example hard disk drive, in accordance with aspects of this disclosure.

FIG. 1 is a perspective view of an example heat assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Figure 2:
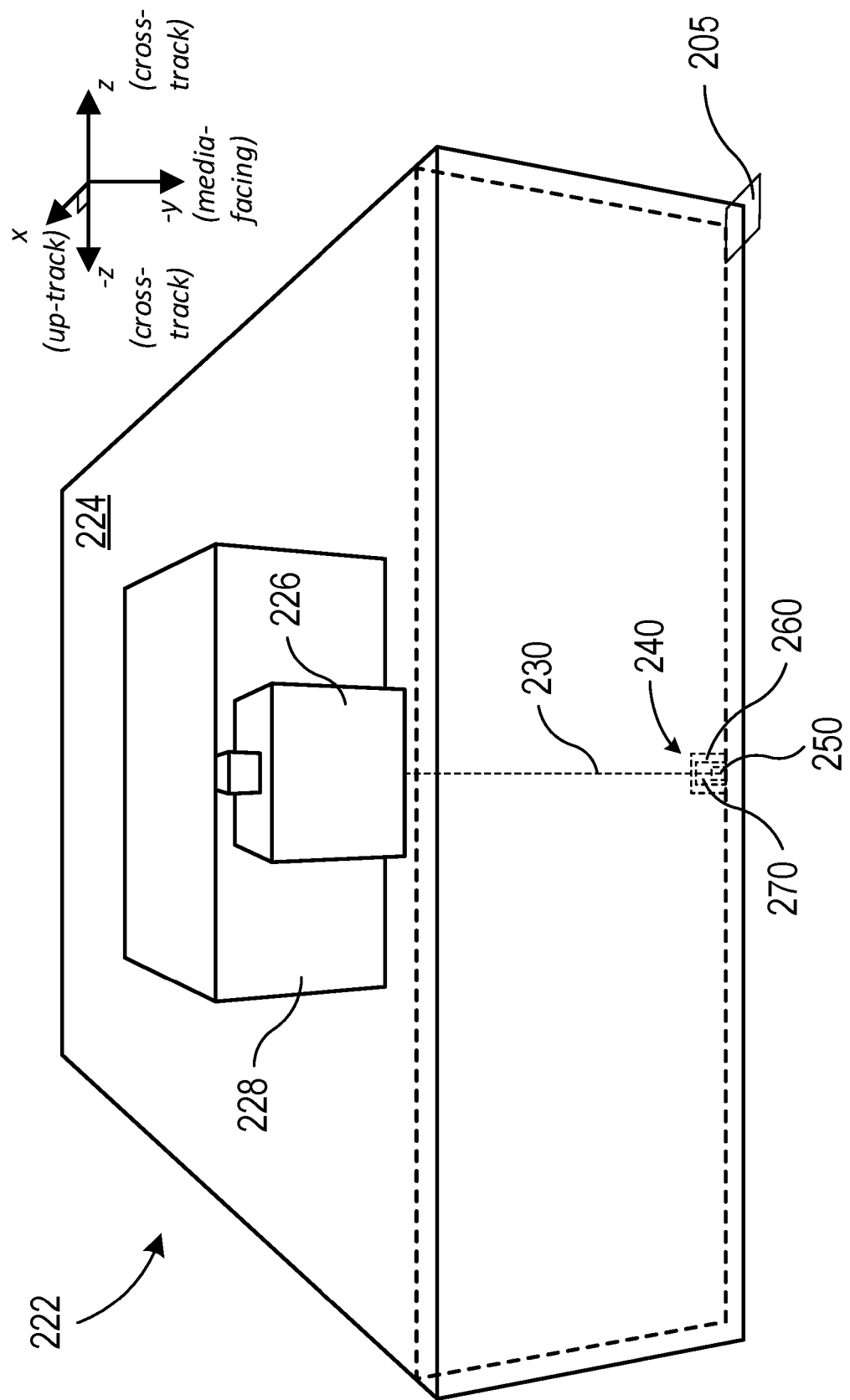
FIG. 2 is a perspective view of an example slider, in accordance with aspects of this disclosure.

FIG. 2 is a perspective view of an example slider 222, in accordance with aspects of this disclosure. Slider 222 is an example of slider 122 of FIG. 1. In the example of FIG. 2, slider 222 includes a slider body 224, a laser 226, a submount 228, and a HAMR head 240.

HAMR head 240 is configured to read data from and write data to a surface of a magnetic disk. HAMR head 240 includes a waveguide 230, a near-field transducer (NFT) 250, a writer 260, and a reader 270. In the example of FIG. 2, some features or parts of features of NFT 250, writer 260, and reader 270 are presented on a media-facing surface 205 that is positioned over a surface of a magnetic disk during some operations of the HDD (e.g., write operations, read operations). In some examples, media-facing surface 205 is an air-bearing surface (ABS) that is configured to maintain HAMR head 240 at a target spacing (e.g., a head-media spacing) from a surface of the magnetic disk during some operations of HDD 100. During such operations, media-facing surface 205 faces and is held proximate to the moving surface of the magnetic disk by a cushion of gas, known as an active air bearing (AAB), that is produced from a dynamic flow of gas across a pattern of recessed sub-surfaces bound within the volume of slider body 224 by media-facing surface 205.

Laser 226 is configured to emit photons of a target wavelength. In some examples, laser 226 emits photons with a wavelength in the near infrared range (e.g., approximately 830 nm) or visible range. Examples of laser 226 include an optically pumped semiconductor laser, a quantum well laser, an integrated laser, or other suitable laser. Laser 226 of this example may be configured as an edge emitting laser (EEL), vertical cavity surface emitting laser (VCSEL), or other type of laser. Other example HAMR heads may include other types of light sources such as light emitting diodes (LEDs) and surface emitting diodes.

In one example, laser 226 is coupled to slider body 224 via submount 228. In the example of FIG. 2, laser 226 and submount 228 are located on a face of slider body 224 which is opposite to media-facing surface 205. In some examples, laser 226 may be directly mounted to the slider body 224. Submount 228 may be configured to redirect photons output from laser 226 so that the photons are directed into waveguide 230 in the negative y-direction of FIG. 2 (e.g., toward NFT 250). The path between laser 226 and waveguide 230 may include one or more optical couplers, mode converters, and/or mode couplers. Waveguide 230 is formed integrally within slider body 224 and is configured to deliver photons from laser 226 to NFT 250. While FIG. 2 illustrates laser 226 coupled to slider body 224 via submount 228, in some examples, laser 226 may be directly mounted to slider body 224.

NFT 250 is configured to create a small hot spot on a magnetic disk. For example, NFT may generate and support a distribution of localized surface plasmons (LSPs) upon receiving incident photons from laser 226 by way of waveguide 230 and may condense the LSP distribution on an area or feature of NFT 250. NFT 250 amplifies a near-field of the condensed LSP distribution and focuses the near-field toward a surface of a magnetic disk (e.g., a magnetic disk 108 of FIG. 1) to produce a hot spot. Writer 260 is configured to generate a magnetic field from an electrical current and direct the magnetic field at the hot spot on the magnetic disk. The near-field energy heats and lowers the coercivity of the magnetic grains in the hot spot, thereby enabling these magnetic grains to be oriented by the magnetic field generated by writer 260. Turning off laser 226 or moving NFT 250 toward a different location of the magnetic disk (or moving the magnetic disk such that NFT 250 faces a different location of the magnetic disk) removes the focused near-field energy from the hot spot. Removing the near-field energy allows the magnetic grains contained in the spot to cool. The cooling locks in the grain orientation induced by the magnetic field generated by writer 260, thus preserving the bits of written data.

Figure 3:
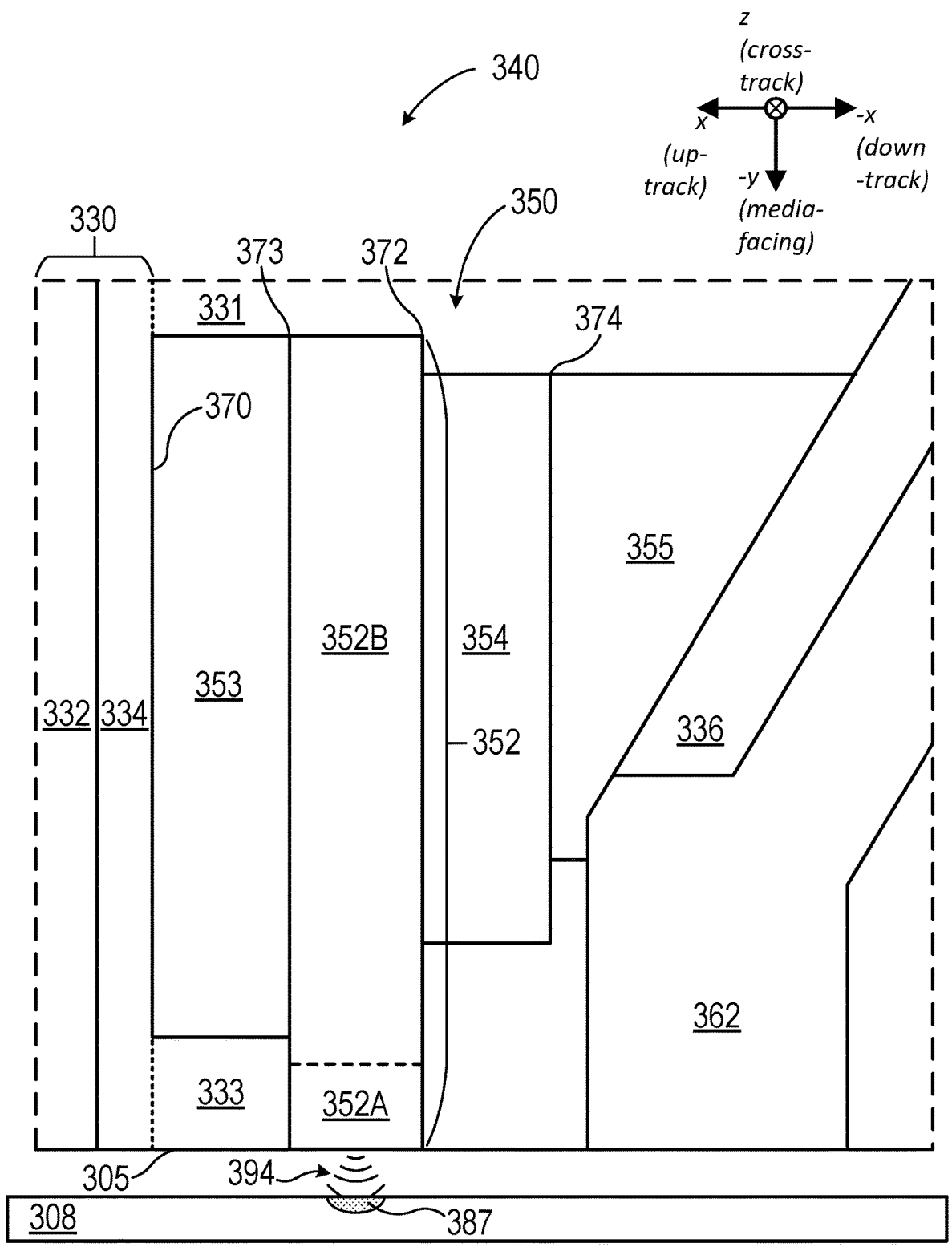
FIG. 3 is a cross-sectional view of an example HAMR head, in accordance with aspects of this disclosure.

FIG. 3 is a cross-sectional view of an example HAMR head, in accordance with aspects of this disclosure. HAMR head 340 includes a waveguide 330, an NFT 350, a write pole 362, a heat sink 355, and a diffuser 336. NFT 350 includes a plasmonic disk 353, a near-field emitter 352, and a middle disk 354.

Waveguide 330 is disposed in an up-track direction relative to plasmonic disk 353, near-field emitter 352, and middle disk 354. Waveguide 330 directs photons from a light source (e.g., laser 226 of FIG. 2) toward NFT 350. In some examples, waveguide 330 includes multiple optical layers. Waveguide 330, for example, may include a waveguide core 332 and a core-to-NFT spacing (CNS) layer 334. CNS layer 334 may be part of a cladding structure that also includes a rear cladding layer 331 and/or a front cladding layer 333. In some examples, waveguide core 332 includes a first dielectric material (e.g., niobium oxide, tantalum oxide) of a first refractive index, and CNS layer 334 includes a second dielectric material (e.g., aluminum oxide, silicon dioxide) of a second refractive index. Photons directed by waveguide 330 toward NFT 350 may couple to free electrons of NFT 350 and excite one or more LSP resonance modes of NFT 350.

NFT 350 is configured to amplify and emit a near-field 394 to produce a hot spot 387 on a magnetic disk 308. Near-field 394 and a magnetic field from write pole 362 are directed to be partially coincident on spot 387 such that the temperature increase resulting from near-field 394 reduces the magnetic coercivity of the grains within hot spot 387 and enables the magnetic field from write pole 362 to orient them more easily, thus producing more stable bits of written data upon cooling.

Heat sink 355 is disposed in a down-track direction relative to middle disk 354 and is coupled to middle disk 354. In some examples, heat sink 355 and middle disk 354 are coupled to each other at an interface 374 that is substantially orthogonal to media-facing surface 305. Interface 374 includes a down-track surface of middle disk 354 and an up-track surface of heat sink 355. Heat sink 355 is configured to draw heat away from regions of NFT 350 and direct the heat toward other regions of HAMR head 340. In the example of HAMR head 340, heat sink 355 is coupled to diffuser 336, with diffuser 336 disposed in a down-track direction relative to heat sink 355. Diffuser 336 is a heat sink that is configured to draw heat from NFT 350 and dissipate the heat toward other areas of HAMR head 340 (e.g., toward other heat sinks). In some examples, drawing heat away from regions of NFT 350 that are prone to thermal degradation may reduce defect formation in NFT 350 and/or extend the operating lifetime of HAMR head 340. Heat sink 355 and/or diffuser 336 may include a thermally conductive material (e.g., gold). In some examples, heat sink 355 includes rhodium, copper, tungsten, tantalum, iridium, platinum, ruthenium, nickel, iron, or combinations thereof.

Plasmonic disk 353 is disposed in an up-track direction relative to near-field emitter 352 and middle disk 354. Plasmonic disk 353 is coupled to waveguide 330. In some examples, plasmonic disk 353 and waveguide 330 are coupled to each other at an interface 370 that is substantially orthogonal to media-facing surface 305. Interface 370 includes a down-track surface of waveguide 330 and an up-track surface of plasmonic disk 353.

Plasmonic disk 353 is configured to generate and support LSPs through resonance coupling of electrons with incident photons which are generated by a light source (e.g., laser 226 of FIG. 2) and are directed toward NFT 350 by waveguide 330. Plasmonic disk 353 includes a plasmonic metal. As used herein, a plasmonic metal is a metal that possesses properties (e.g., electrical properties, optical properties) that promote resonance coupling between photons incident upon the plasmonic metal and free electrons of the plasmonic metal. Such resonant coupling of a photon with free electrons of the plasmonic metal may excite one or more plasmonic modes of the plasmonic metal, which may result in the generation of an LSP on a surface of the plasmonic metal. Plasmonic metals that demonstrate efficient plasmon generation in response to photons of a wavelength target or range are said to have a high plasmonic figure of merit. Examples of plasmonic metals include gold, silver, ruthenium, copper, aluminum, and/or rhodium. In some instances, plasmonic disk 353 includes one of these plasmonic metals, an alloy of one of these plasmonic metals, and/or another noble metal including palladium, osmium, iridium, or platinum.

Near-field emitter 352 is configured to emit near-field 394 to produce hot spot 387 on magnetic disk 308. Near-field emitter 352 includes a peg 352A and an anchor disk 352B. Peg 352A is disposed proximal to a media-facing surface 305 of HAMR head 340. In some instances, one or more portions of peg 325A are exposed on media-facing surface 305. Peg 352A is configured to receive and amplify a near-field of the distribution of LSPs and emit near-field 394 to produce hot spot 387 on magnetic disk 308.

Anchor disk 352B is disposed behind peg 352A relative to media-facing surface 305 (e.g., in the +y dimension, opposite the −y media-facing dimension). Anchor disk 352B is coupled to plasmonic disk 353. In some examples, anchor disk 352B and plasmonic disk 353 are coupled to each other at an interface 373 that is substantially orthogonal to media-facing surface 305. Interface 373 includes a down-track surface of plasmonic disk 353 and an up-track surface of anchor disk 352B. Anchor disk 352B is coupled to middle disk 354. In some examples, middle disk 354 and anchor disk 352B are coupled to each other at an interface 372 that is substantially orthogonal to media-facing surface 305. Interface 372 includes a down-track surface of anchor disk 352B and an up-track surface of middle disk 354.

Anchor disk 352B is configured to support a distribution of LSPs. In some examples, anchor disk 352B is configured to participate in LSP generation. For example, peg 352A may generate hotspot 387 by receiving and condensing a distribution of LSPs from anchor disk 352B and/or other features, amplifying a near-field of the LSP distribution, and emitting amplified near-field 394 toward the surface of magnetic disk 308.

In some examples, near-field emitter 352 is a single, continuous feature comprising peg 352A and anchor disk 352B. That is, peg 352A and anchor disk 352B may be regions or features of a single piece. Near-field emitter 352 may, for example, be deposited during a single manufacturing level or step (e.g., a photolithography level, a metal deposition step), with the shape and dimensions of the peg 352A and anchor disk 352B defined by a lithography pattern. In these examples, near-field emitter 352 may taper or narrow toward peg 352A. Peg 352A may protrude from anchor disk 352B in the vicinity of media-facing surface 305 to enable LSPs to be transferred from anchor disk 352B to peg 352A and to enable peg 352A to amplify and emit near-field 394 toward magnetic disk 308. In some examples, peg 352A and anchor disk 352B each include one or more of the same materials. For example, peg 352A and anchor disk 352B may both include iridium, rhodium, ruthenium, gold alloy(s), gold composite(s) (e.g., a gold-nanoparticle composite), or combinations thereof.

Middle disk 354 is disposed in a down-track direction relative to near-field emitter 352 and is coupled to anchor disk 352B. In some examples, middle disk 354 is configured to direct localized surface plasmons toward peg 352A of near-field emitter 352. In some examples, middle disk 354 is configured to mitigate background fields.

In accordance with aspects of this disclosure, middle disk 354 has a high melting temperature (e.g., at least 1500° C.). In some examples, middle disk 354 has a melting temperature of at least 1800° C. or at least 2200° C. A middle disk 354 having a high melting temperature may increase the lifespan of NFT 350 by reducing the likelihood of melting, void formation, diffusion, densification, and/or other defects at temperatures that are reached in a HAMR head under normal operating conditions.

A high melting temperature may be achieved by including one or more metals in middle disk 354. For example, middle disk 354 may include a transition metal. A transition metal of middle disk 354 may be a platinum group metal (e.g., iridium, ruthenium, rhodium, osmium, platinum, palladium).

In some examples, the transition metal is a primary metal of middle disk 354. As used herein the term "primary metal" refers to a metal that is present in a feature in an amount (e.g., atomic percentage or weight percentage) that is greater than any other metal that is also present in the same feature. That is, the primary metal constitutes greater than 50 atomic percent of middle disk 354 while the other portion of middle disk 354 includes one or more other materials. For example, the primary metal constitutes at least 50 atomic percent of middle disc 354. In some examples, the primary metal constitutes at least 90 atomic percent of middle disc 354 (e.g., 95%, 99%, 99.9%).

In some examples, the transition metal is a component of an alloy of middle disk 354. That is, the transition metal may be included with one or more other metals (e.g., other transition metals such as gold, non-transition metals) to form an alloy of middle disk 354.

Figure 4:
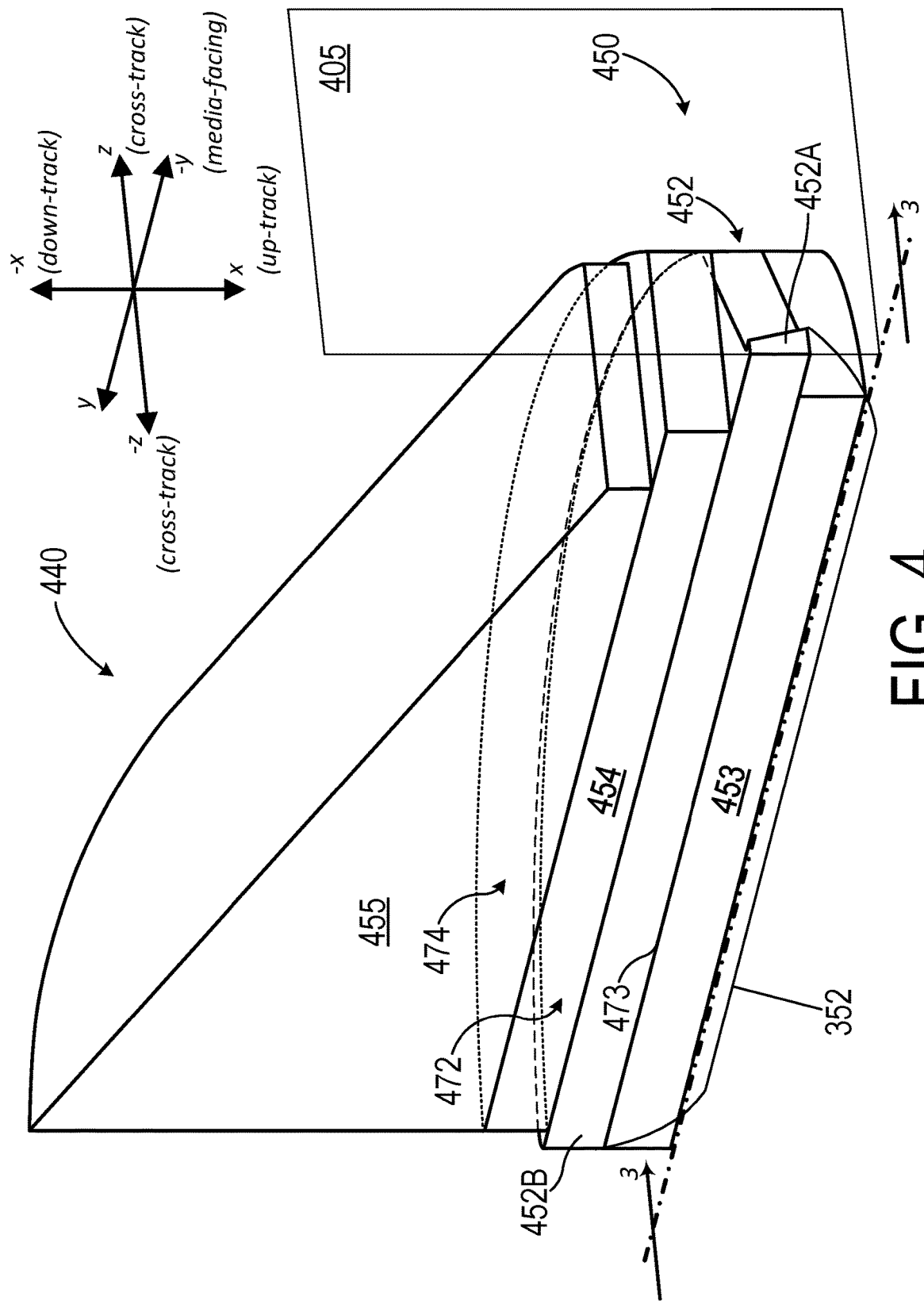
FIG. 4 is a perspective view of an example HAMR head, in accordance with aspects of this disclosure.

FIG. 4 is a perspective view of an example HAMR head, in accordance with aspects of this disclosure. FIG. 4 may be a perspective view of HAMR head 340 of FIG. 3, with the view of the section of HAMR head 340 illustrated in FIG. 3 indicated by the line 3-3 of FIG. 4 facing in the direction of the arrows. HAMR head 440 includes an NFT 450 and a heat sink 455. NFT 450 includes a plasmonic disk 453, a near-field emitter 452, and a middle disk 454.

Heat sink 455 is disposed in a down-track direction relative to the middle disk 454. Heat sink 455 and middle disk 454 are coupled to each other at an interface 474. In some examples, interface 474 is substantially orthogonal to a media-facing surface 405 and substantially parallel to cross-track and media-facing dimensions (z and y, respectively) of HAMR head 440.

Near-field emitter includes a peg 452A and an anchor disk 452B. Peg 452A is disposed proximal to media-facing surface 405 of HAMR head 440. Anchor disk 452B is disposed behind peg 452A relative to media-facing surface 405. In some examples, near-field emitter 452 is a single, continuous feature including peg 452A and anchor disk 452B. Anchor disk 452B occupies an area of a plane that is defined by a cross-track dimension (z) of HAMR head 440 and a media-facing dimension (y) of HAMR head 440 (hereafter, a near-field emitter plane). The near-field emitter plane may be orthogonal to media-facing surface 405. Peg 452A occupies an area of the near-field emitter plane that is smaller than the area of the near-field emitter plane that is occupied by anchor disk 452B.

Plasmonic disk 453 is disposed in an up-track direction relative to the near-field emitter 452. Anchor disk 452B is coupled to plasmonic disk at an interface 473. In some examples, interface 473 is substantially orthogonal to media-facing surface 405.

Middle disk 454 is disposed in a down-track direction relative to near-field emitter 452. Anchor disk 452B is coupled to middle disk 454 at an interface 472. In some examples, interface 472 is substantially orthogonal to media-facing surface 405. Middle disk 454 includes a thermally stable primary metal.

Figure 5:
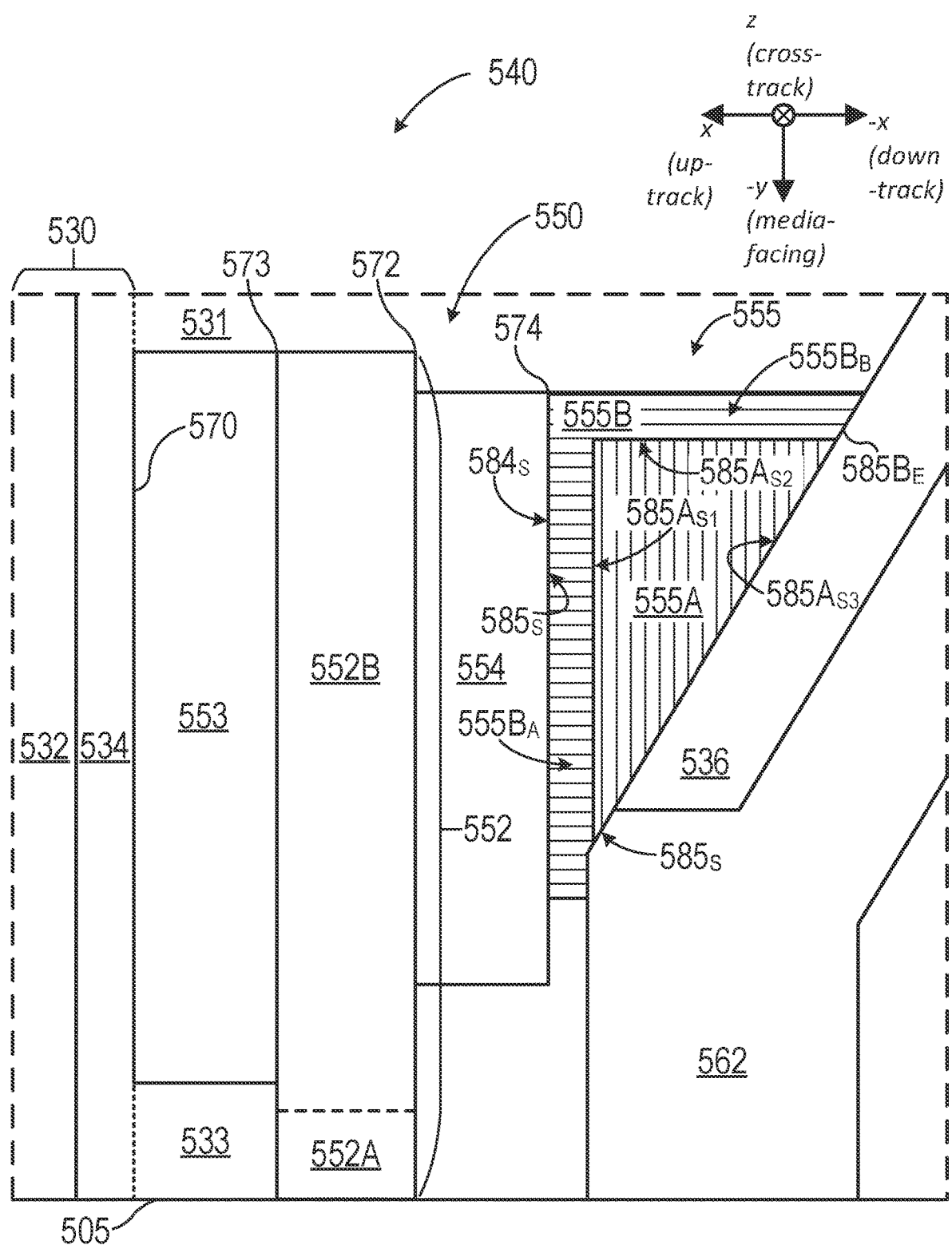
FIG. 5 is a cross-sectional view of an example HAMR head, in accordance with aspects of this disclosure.

FIG. 5 is a cross-sectional view of an example HAMR head, in accordance with aspects of this disclosure. HAMR head 540 includes a waveguide 530, an NFT 550, a write pole 562, a heat sink 555, and a diffuser 536. NFT 550 includes a plasmonic disk 553, a near-field emitter 552, and a middle disk 554.

Waveguide 530 is disposed in an up-track direction relative to plasmonic disk 553, near-field emitter 552, and middle disk 554. In some examples, waveguide 530 includes multiple optical layers. Waveguide 530, for example, may include a waveguide core 532 and a core-to-NFT spacing (CNS) layer 534. CNS layer 534 may be part of a cladding structure that also includes a rear cladding layer 531 and/or a front cladding layer 533. In some examples, waveguide core 532 includes a first dielectric material (e.g., niobium oxide, tantalum oxide) of a first refractive index, and CNS layer 534 includes a second dielectric material (e.g., aluminum oxide, silicon dioxide) of a second, different refractive index.

Plasmonic disk 553 is disposed in an up-track direction relative to near-field emitter 552 and middle disk 554. Plasmonic disk 553 is coupled to waveguide 530. In some examples, plasmonic disk 553 and waveguide 530 are coupled to each other at an interface 570 that is substantially orthogonal to a media-facing surface 505 of HAMR head 540. Interface 570 includes a down-track surface of waveguide 530 and an up-track surface of plasmonic disk 553.

Near-field emitter 552 includes a peg 552A and an anchor disk 552B. Peg 552A is disposed proximal to media-facing surface 505. In some instances, one or more portions of peg 325A are exposed on media-facing surface 505. Anchor disk 552B is disposed behind peg 552A relative to media-facing surface 505 (e.g., in the +y dimension, opposite the −y media-facing dimension). Anchor disk 552B is coupled to plasmonic disk 553. In some examples, anchor disk 552B and plasmonic disk 553 are coupled to each other at an interface 573 that is substantially orthogonal to media-facing surface 505. Interface 573 includes a down-track surface of plasmonic disk 553 and an up-track surface of anchor disk 552B. Anchor disk 552B is coupled to middle disk 554.

In some examples, near-field emitter 552 is a single, continuous feature including peg 552A and anchor disk 552B. That is, peg 552A and anchor disk 552B may be regions or features of a single piece. In these examples, near-field emitter 552 may taper or narrow toward peg 552A. Peg 552A protrudes from anchor disk 552B in the vicinity of media-facing surface 505 to enable LSPs to be transferred from anchor disk 552B to peg 552A and to enable peg 552A to amplify and emit a near-field toward magnetic disk. In one example, peg 552A and anchor disk 552B each include one or more of the same materials. In some examples, peg 552A and anchor disk 552B both include iridium, rhodium, ruthenium, gold alloy(s), gold composite(s) (e.g., a gold-nanoparticle composite), or combinations thereof.

Middle disk 554 is disposed in a down-track direction relative to near-field emitter 552 and is coupled to anchor disk 552B. In some examples, middle disk 554 and anchor disk 552B are coupled to each other at an interface 572 that is substantially orthogonal to media-facing surface 505. Interface 572 includes a surface down-track surface of anchor disk 552B and an up-track surface of middle disk 554.

In some examples, middle disk 554 includes a primary metal. In some examples, the primary metal constitutes at least 50 atomic percent of middle disc 554. In some examples, the primary metal constitutes at least 90 atomic percent of middle disc 554. In some examples, the primary metal constitutes at least 95 atomic percent of middle disc 554. In some examples, the primary metal constitutes at least 99 atomic percent of middle disc 554.

Heat sink 555 is disposed in a down-track direction relative to middle disk 554 and is coupled to middle disk 554. In some examples, heat sink 555 and middle disk 554 are coupled to each other at an interface 574 that is substantially orthogonal to a media-facing surface 505 of HAMR head 540. Interface 574 includes a surface $584_S$ of middle disk 554 and a surface $585_S$ of heat sink 555.

Heat sink 555 includes a core 555A including a primary metal and a liner 555B. Liner 555B is coupled to core 555A and is disposed along outer surfaces $585A_{S1}$ and $585A_{S2}$ of core 555A. Middle disk 554 is disposed between and coupled to liner 555B and anchor disk 552B.

Liner 555B includes a first portion $555B_A$ that is substantially parallel to middle disk 554 and disposed between and coupled to middle disk 554 and core 555A. Liner 555B includes a second portion $555B_B$ that is oriented substantially orthogonal to middle disk 554 and substantially parallel to a down-track dimension of the HAMR head 540.

Heat sink 555 includes a down-track surface $585_S$ on a side of heat sink 555 that is opposite middle disk 554. Down-track surface $585_S$ slopes away from media-facing surface 505 toward the down-track direction. Down-track surface $585_S$ includes a surface $585A_{S3}$ of core 555A and an edge $585B_E$ of liner 555B. Down-track surface $585_S$ is coupled to diffuser 536.

In accordance with aspects of this disclosure, liner 555B has a high melting temperature (e.g., at least 1500° C.). In some examples, liner 555B has a melting temperature of at least 1800° C. or at least 2200° C. Disposing a liner 555B having a high melting temperature along one or more outer surfaces of core 555A may reduce thermal defect formation in a core 555A (e.g., a core 555A that includes gold). For example, a liner 555B having a high melting temperature may reduce recession of a core 555A that includes gold, wherein the recession initiates near peg 552A and progresses away from media-facing surface 505. In some examples, including a liner 555B having a high melting temperature may reduce or eliminate delamination between middle disk 554 and heat sink 555 when HAMR head 540 is exposed to thermal stress. Including a liner 555B having a high melting temperature may enable heat sink 555 to dissipate heat more effectively over extended operation of HAMR head 540 and may extend the lifetime of HAMR head 540.

A high melting temperature may be achieved by including one or more metals in liner 555B. For example, liner 555B may include a transition metal. A transition metal of liner 555B may be a platinum group metal (e.g., iridium, ruthenium, rhodium, osmium, platinum, palladium). In some examples, the transition metal is a component of an alloy of liner 555B.

In some examples, the transition metal is a primary metal of liner 555B. That is, the transition metal may constitute at least 50 atomic percent of liner 555B (e.g., 90%, 95%, 99%, 99.9%). In some scenarios, the primary metal of liner 555B is different than the primary metal of core 555A.

Figure 6:
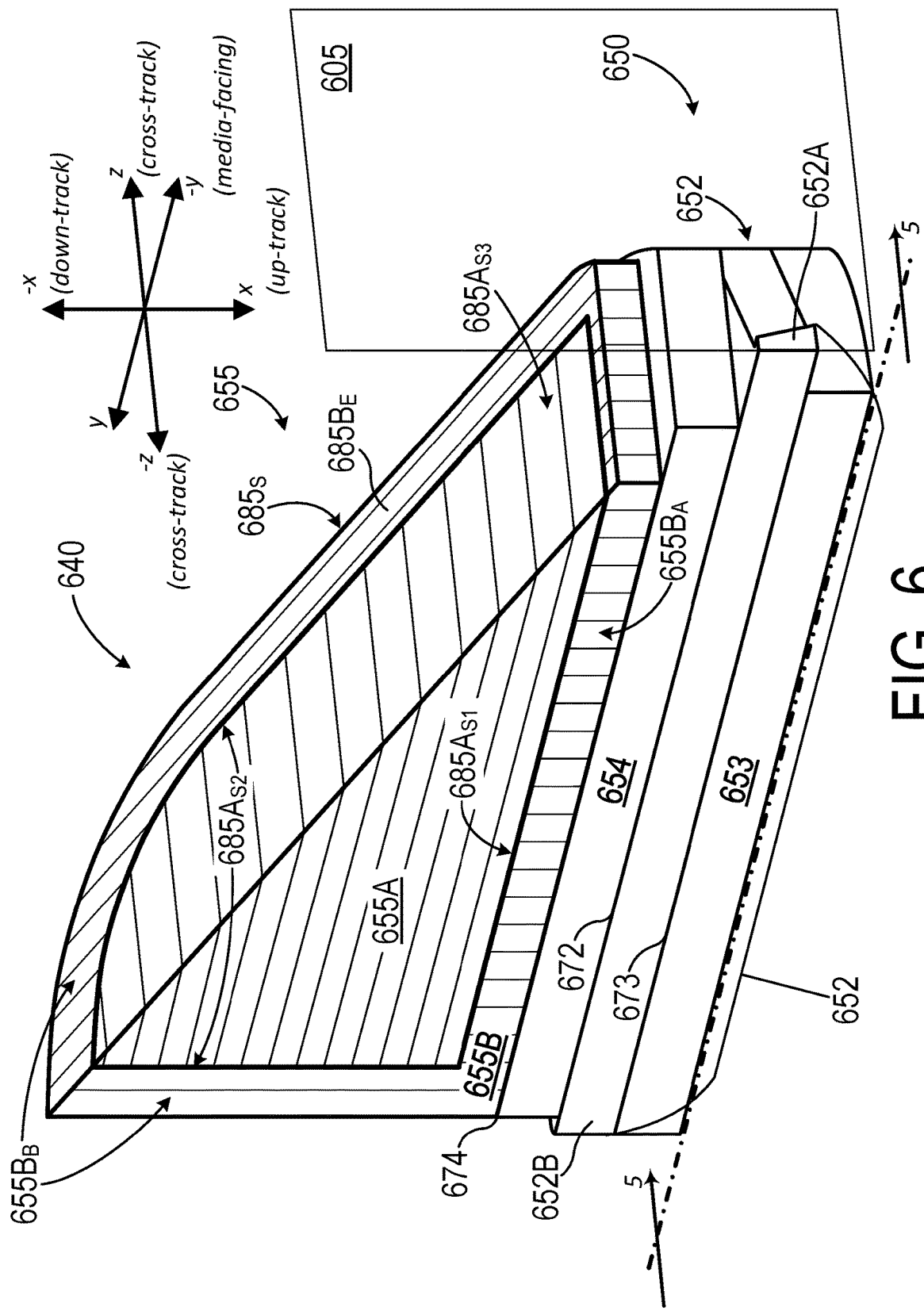
FIG. 6 is a perspective view of an example HAMR head, in accordance with aspects of this disclosure.

FIG. 6 is a perspective view of an example HAMR head, in accordance with aspects of this disclosure. FIG. 6 may be a perspective view of HAMR head 540 of FIG. 5, with the view of the section of HAMR head 540 illustrated in FIG. 5 indicated by the line 5-5 of FIG. 6 facing in the direction of the arrows. HAMR head 640 includes an NFT 650 and a heat sink 655. NFT 650 includes a plasmonic disk 653, a near-field emitter 652, and a middle disk 654.

Near-field emitter includes a peg 652A and an anchor disk 652B. Peg 652A is disposed proximal to a media-facing surface 605 of HAMR head 640. Anchor disk 652B is disposed behind peg 652A relative to media-facing surface 605. In some examples, near-field emitter 652 is a single, continuous feature including peg 652A and anchor disk 652B. Anchor disk 652B occupies an area of a plane that is defined by a cross-track dimension (z) of HAMR head 640 and a media-facing dimension (y) of HAMR head 640 (hereafter, a near-field emitter plane). The near-field emitter plane may be orthogonal to media-facing surface 605. Peg 652A occupies an area of the near-field emitter plane that is smaller than the area of the near-field emitter plane that is occupied by anchor disk 652B.

Plasmonic disk 653 is disposed in an up-track direction relative to the near-field emitter 652. Anchor disk 652B is coupled to plasmonic disk at an interface 673. In some examples, interface 673 is substantially orthogonal to media-facing surface 605.

Middle disk 654 is disposed in a down-track direction relative to near-field emitter 652. Anchor disk 652B is coupled to middle disk 654 at an interface 672. In some examples, interface 672 is substantially orthogonal to media-facing surface 605. Middle disk 654 may includes a thermally stable primary metal.

Heat sink 655 is disposed in a down-track direction relative to the middle disk 654. Heat sink 655 and middle disk 654 are coupled to each other at an interface 674. In some examples, interface 674 is substantially orthogonal to a media-facing surface 605 and substantially parallel to cross-track and media-facing dimensions (z and y, respectively) of HAMR head 640.

Heat sink 655 includes a core 655A including a primary metal, and a liner 655B including a primary metal. Liner 655B includes a first portion $655B_A$ that is substantially parallel to middle disk 654 and disposed between and coupled to middle disk 654 and core 655A. Liner 655B includes a second portion $655B_B$ that is oriented substantially orthogonal to middle disk 654 and substantially parallel to a down-track dimension of HAMR head 640. Liner 655B encloses core 655A on a side $655A_{S1}$ of core 655A that faces near-field transducer 650 and on a curved outer surface $655A_{S2}$ of core 655A that is substantially parallel to a down-track dimension. Heat sink 655 includes a down-track surface $685_S$ on a side of heat sink 655 that is opposite middle disk 654. Down-track surface $685_S$ slopes away from media-facing surface 605 toward the down-track direction. Down-track surface $685_S$ includes a surface $685A_{S3}$ of core 655A and an edge $685B_E$ of liner 655B.

What is claimed is:

1. A heat-assisted magnetic recording head comprising:
    a near-field transducer; and
    a heat sink,
    the near-field transducer comprising:
        a middle disk; and
        a near-field emitter comprising:
            a peg configured to produce a hot spot on a proximal magnetic disk, the peg disposed proximal to a media-facing surface of the heat-assisted magnetic recording head; and
            an anchor disk disposed behind the peg relative to the media-facing surface,
    the heat sink comprising:
        a core comprising a primary metal; and
        a liner having a melting temperature of at least 1500 degrees Celsius,
        wherein the liner is coupled to the core and is disposed along an outer surface of the core, and
        wherein the middle disk is disposed between and coupled to the liner and the anchor disk.

2. The heat-assisted magnetic recording head of claim 1, wherein the liner comprises a transition metal.

3. The heat-assisted magnetic recording head of claim 2, wherein the transition metal is a primary metal of the liner that is different than the primary metal of the core.

4. The heat-assisted magnetic recording head of claim 3, wherein the primary metal of the liner comprises at least 95 atomic percent of the liner.

5. The heat-assisted magnetic recording head of claim 2, wherein the transition metal is a component of an alloy of the liner.

6. The heat-assisted magnetic recording head of claim 2, wherein the transition metal is a platinum group metal.

7. The heat-assisted magnetic recording head of claim 1, wherein the middle disk has a melting temperature of at least 1500 degrees Celsius.

8. The heat-assisted magnetic recording head of claim 1, wherein the liner comprises:
    a first portion that is substantially parallel to the middle disk and disposed between and coupled to the middle disk and the core, and
    a second portion that is oriented substantially orthogonal to the middle disk and substantially parallel to a down-track dimension of the heat-assisted magnetic recording head.

9. The heat-assisted magnetic recording head of claim 1, wherein the liner encloses the core on a side of the core that faces the near-field transducer and on a curved outer surface of the core that is substantially parallel to a down-track dimension of the heat-assisted magnetic recording head.

10. The heat-assisted magnetic recording head of claim 1, wherein the heat sink comprises a down-track surface on a side of the heat sink that is opposite the middle disk, wherein the down-track surface slopes away from the media-facing surface toward a down-track direction of the heat-assisted magnetic recording head, and
    wherein the down-track surface comprises:
        a surface of the core; and
        an edge of the liner.

11. The heat-assisted magnetic recording head of claim 10, wherein the down-track surface is coupled to a diffuser of the heat-assisted magnetic recording head.

12. The heat-assisted magnetic recording head of claim 1, wherein the heat sink is disposed in a down-track direction relative to the middle disk.

13. The heat-assisted magnetic recording head of claim 1, wherein the near-field emitter is a single, continuous feature comprising the peg and the anchor disk.

14. The heat-assisted magnetic recording head of claim 1, wherein the middle disk is disposed in a down-track direction relative to the near-field emitter, and
    wherein the middle disk is coupled to the anchor disk.

15. The heat-assisted magnetic recording head of claim 14,
    wherein the middle disk and the anchor disk are coupled to each other at an interface that is substantially orthogonal to a media-facing surface of the heat-assisted magnetic recording head, and
    wherein the interface comprises a surface of the anchor disk and a surface of the middle disk.

16. The heat-assisted magnetic recording head of claim 1, further comprising a plasmonic disk,
    wherein the plasmonic disk is disposed in an up-track direction relative to the middle disk, and
    wherein the anchor disk is coupled to the plasmonic disk.

17. The heat-assisted magnetic recording head of claim 16,
    wherein the anchor disk and the plasmonic disk are coupled to each other at an interface that is substantially orthogonal to the media-facing surface, and
    wherein the interface comprises a surface of the plasmonic disk and a surface of the anchor disk.

18. The heat-assisted magnetic recording head of claim 16, further comprising a waveguide, wherein the waveguide is disposed in an up-track direction relative to the middle disk, and wherein the plasmonic disk is coupled to the waveguide.

19. The heat-assisted magnetic recording head of claim 18,
wherein the plasmonic disk and the waveguide are coupled to each other at an interface that is substantially orthogonal to the media-facing surface, and
wherein the interface comprises a surface of the waveguide and a surface of the plasmonic disk.

20. The heat-assisted magnetic recording head of claim 1,
wherein the anchor disk occupies an area of a plane that is defined by a cross-track dimension of the heat-assisted magnetic recording head and a media-facing dimension of the heat-assisted magnetic recording head, and
wherein the peg occupies an area of the plane that is smaller than the area of the plane that is occupied by the anchor disk.

* * * * *